United States Patent
Terry et al.

(10) Patent No.: US 8,816,669 B2
(45) Date of Patent: Aug. 26, 2014

(54) SHORT CIRCUIT MONITOR FOR CURRENT SET RESISTOR

(75) Inventors: Stephen Christopher Terry, Knoxville, TN (US); Paul L. Brohlin, Parker, TX (US)

(73) Assignee: Texas Instruments Inc., Dallas, TX (US)

( * ) Notice: Subject to any disclaimer, the term of this patent is extended or adjusted under 35 U.S.C. 154(b) by 532 days.

(21) Appl. No.: 12/421,811

(22) Filed: Apr. 10, 2009

(65) Prior Publication Data

US 2010/0066345 A1 Mar. 18, 2010

Related U.S. Application Data

(60) Provisional application No. 61/096,965, filed on Sep. 15, 2008.

(51) Int. Cl.
*H02H 3/00* (2006.01)

(52) U.S. Cl.
USPC ............. 323/315; 320/137; 61/18; 61/86; 61/88; 61/93.1

(58) Field of Classification Search
USPC ..... 320/134, 137, DIG. 12, DIG. 13, DIG. 22
See application file for complete search history.

(56) References Cited

U.S. PATENT DOCUMENTS

| | | | | |
|---|---|---|---|---|
| 5,233,287 A | * | 8/1993 | Lenk | 323/268 |
| 5,408,497 A | * | 4/1995 | Baumann et al. | 375/219 |
| 5,909,348 A | * | 6/1999 | Zydek et al. | 361/79 |
| 6,222,709 B1 | * | 4/2001 | Baba | 361/18 |
| 7,218,496 B2 | * | 5/2007 | Kitagawa | 361/93.9 |
| 7,271,601 B2 | * | 9/2007 | Moyer et al. | 324/713 |
| 7,292,019 B1 | * | 11/2007 | Fernald | 323/354 |
| 7,394,223 B2 | * | 7/2008 | Lai et al. | 320/134 |
| 7,598,710 B2 | * | 10/2009 | Zhang | 320/137 |
| 7,668,607 B1 | * | 2/2010 | Fernald | 700/52 |
| 7,672,107 B2 | * | 3/2010 | So | 361/93.9 |
| 7,760,478 B2 | * | 7/2010 | Yang et al. | 361/93.1 |
| 7,813,096 B2 | * | 10/2010 | Takahashi et al. | 361/93.1 |
| 7,848,071 B2 | * | 12/2010 | Takahashi et al. | 361/93.1 |
| 8,232,781 B2 | * | 7/2012 | Marino et al. | 323/271 |
| 2005/0269992 A1 | * | 12/2005 | Lai et al. | 320/134 |
| 2007/0008665 A1 | * | 1/2007 | Moyer et al. | 361/42 |

(Continued)

FOREIGN PATENT DOCUMENTS

WO WO 2007074837 A1 * 7/2007

OTHER PUBLICATIONS

Texas Instruments Incorporated, 1.5A USB-Friendly Li-Ion Battery Charger and Power-Path Management IC, bq24072 data sheet, Sep. 2008-Jan. 2009, www.ti.com, USA.

*Primary Examiner* — Yalkew Fantu
*Assistant Examiner* — Manuel Hernandez
(74) *Attorney, Agent, or Firm* — William B. Kempler; Frederick J. Telecky, Jr.

(57) ABSTRACT

Various apparatuses and methods for supplying an electrical current are disclosed herein. For example, some embodiments provide an apparatus including a current regulation switch connected in a current path between a power input and a current output. A current regulator is connected to the current regulation switch. The current regulator includes a current set terminal, and the current through the current regulation switch is proportional to the current through current set terminal. An impedance monitor is connected to the current set terminal.

17 Claims, 4 Drawing Sheets

(56) References Cited

U.S. PATENT DOCUMENTS

| | | | |
|---|---|---|---|
| 2007/0029975 A1* | 2/2007 | Martin et al. | 320/134 |
| 2007/0146951 A1* | 6/2007 | Takahashi et al. | 361/93.1 |
| 2008/0136377 A1* | 6/2008 | Zhang | 320/137 |
| 2008/0258691 A1* | 10/2008 | Lai et al. | 320/164 |
| 2009/0052096 A1* | 2/2009 | Takahashi et al. | 361/18 |
| 2010/0134939 A1* | 6/2010 | Takahashi et al. | 361/87 |

* cited by examiner

SHORT CIRCUIT MONITOR FOR CURRENT SET RESISTOR

CROSS REFERENCE TO RELATED APPLICATION

Turning now to FIG. 1, an example of a battery charger 10 having an impedance monitor 12 will be described. The battery charger 10 includes a current regulation switch 14 connected between a power input 16 and a current output 20. A current regulator 22 modulates the current regulation switch 14 so that the output current through the current output 20 is proportional to a current through a user connected current set resistor 24 connected to a current set terminal 26. A blocking transistor 30 is connected between the power input 16 and the current regulation switch 14 to block current from the current output 20 to the power input 16. The blocking transistor 30 also has a small resistance that establishes a voltage at an internal node 32 used in the current control process. In one embodiment, the blocking transistor 30 is an N-channel metal oxide semiconductor (NMOS) field effect transistor (FET) that is driven into the triode region by a charge pump 33 or other voltage source connected to the gate 34 of the blocking transistor 30. For example, the gate 34 may be driven to about 7 volts above the source which is connected to the power input 16, although this is not a limiting example. The blocking transistor 30 therefore acts as a resistor during operation with a low resistance on the order of an ohm or less. When the current supply is acting as a battery charger 10, the blocking transistor 30 may be turned off when the power input 16 is turned off to prevent current from a battery at the current output 20 from flowing back through the battery charger 10 to the power input 16.

BACKGROUND

Many types of electronic circuits, such as battery chargers, use current supplies with a user programmable output current. Generally, a user connects a resistor to a current set pin or terminal, and the size of the resistor establishes the output current level. The user selectable resistor controls the current flow through the current set terminal, and the output current is proportional to the current through the current set pin.

One problem with having an externally programmable current level is that if the current set pin is shorted, the current supply can run away with excessive output current levels. This is particularly problematic in a battery charger. Excessive currents to a battery can damage the battery. One solution to this problem is to test the current set pin during startup of the current supply by sourcing a test current to the current set pin to detect whether the current set pin is shorted. However, this approach operates only during startup and does not detect shorts that occur during operation. Furthermore, this approach requires an extra circuit to generate the test current.

SUMMARY

Various apparatuses and methods for supplying an electrical current are disclosed herein. For example, some embodiments provide an apparatus including a current regulation switch connected in a current path between a power input and a current output. A current regulator is connected to the current regulation switch. The current regulator includes a current set terminal, and the current through the current regulation switch is proportional to the current through current set terminal. An impedance monitor is connected to the current set terminal.

In an embodiment of the apparatus, the impedance monitor includes a current mirror connected to the current regulator that produces a current proportional to that through the current set terminal, and a reference impedance is connected to the current mirror.

In an embodiment of the apparatus, the impedance monitor also includes a comparator having a first input connected to the reference impedance and having a second input connected to the current set terminal. An output of the comparator is asserted when an impedance of the current set terminal falls below the reference impedance.

An embodiment of the apparatus is adapted to block the current path when the output of the comparator in the impedance monitor is asserted.

In an embodiment of the apparatus, the impedance monitor also includes a low current detector connected to the current mirror, and the output of the comparator is gated off when the low current detector detects that the current through the current mirror is lower than a threshold current level.

In an embodiment of the apparatus, the low current detector includes a second comparator having a first input connected to the reference impedance and a second input connected to a reference voltage.

In an embodiment of the apparatus, the impedance monitor also includes an AND gate with a first input connected to the output of the comparator, a second input connected to an output of the low current detector, and an output connected to an output of the impedance monitor.

An embodiment of the apparatus also includes a deglitcher connected to the impedance monitor.

In an embodiment of the apparatus, the current regulator also includes a current limiter adapted to limit the current through the current regulation switch.

An embodiment of the apparatus also includes a blocking transistor having a source connected to the power input and a drain connected to the current regulation switch. The current regulator also includes a sense transistor having a source connected to the power input and a gate connected to a gate of the blocking transistor, a second transistor having a source connected to a drain of the sense transistor and a drain connected to the current set terminal, and an amplifier having a first input connected to the drain of the blocking transistor, a second input connected to the source of the second transistor, and an output connected to a gate of the second transistor.

In an embodiment of the apparatus, the current mirror includes a third transistor having a source connected to the drain of the blocking transistor, a gate connected to the output of the amplifier, and a drain connected to the reference impedance.

In an embodiment of the apparatus, the reference impedance has a value equal to a short resistance threshold multiplied by a ratio between an aspect ratio of the second transistor and an aspect ratio of the third transistor. The impedance of the current set terminal is identified as short circuited when it is less than the short resistance threshold.

In an embodiment of the apparatus, the current regulator also includes a control circuit having an input connected to the current set terminal and an output connected to the current regulation switch. The control circuit is adapted to modulate the current regulation switch to maintain a predetermined voltage level at the current set terminal.

In an embodiment of the apparatus, the amplifier is adapted to maintain the same voltage level at the drain of the sense transistor as at the drain of the block transistor.

Other embodiments provide a method of supplying an electrical current. The method includes modulating a current regulation switch between a power input and a current output to provide an output current that is proportional to a current through a current set terminal. The method also includes generating a mirror current that is proportional to the current through the current set terminal and passing the mirror current through a reference impedance. The method also includes comparing a first voltage at the reference impedance with a second voltage at the current set terminal, and blocking the output current if the second voltage falls below the first voltage.

In an embodiment of the method, the comparing is performed continuously during normal operation of the supplying of the electrical current.

An embodiment of the method also includes deglitching a result of the comparing before blocking the output current.

An embodiment of the method also includes disabling the blocking if the mirror current is lower than a threshold current.

An embodiment of the method also includes limiting the output current to an upper current limit at least during the deglitching.

In other instances of the aforementioned apparatus for supplying an electrical current, the apparatus includes a power input, a current output, a blocking transistor having a source connected to the power input, and a regulation transistor having a drain connected to a drain of the blocking transistor and a source connected to the current output. The source of a sense transistor is connected to the power input and a gate of the sense transistor is connected to a gate of the blocking transistor. A fourth transistor has a source connected to a drain of the sense transistor and a drain connected to a current set terminal. An amplifier has a first input connected to the drain of the blocking transistor, a second input connected to the source of the fourth transistor, and an output connected to a gate of the fourth transistor. A control circuit is connected between the current set terminal and a gate of the regulation transistor. The control circuit is adapted to modulate the regulation transistor to maintain a predetermined voltage level at the current set terminal. A fifth transistor has a source connected to the drain of the blocking transistor and a gate connected to the output of the amplifier. A reference impedance is connected between a drain of the fifth transistor and a ground. A comparator has a first input connected to the drain of the fifth transistor and a second input connected to the current set terminal. A second comparator has a first input connected to the drain of the fifth transistor and a second input connected to a voltage reference. An AND gate has a first input connected to an output of the comparator and a second input connected to an output of the second comparator. A deglitcher is connected to an output of the AND gate. The apparatus is adapted to block a current through the current output when an output of the deglitcher is asserted.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

The drawings and description, in general, disclose various embodiments of an apparatus and method for supplying an electrical current, such as in a battery charger. In particular, a load independent, real-time monitor circuit is disclosed which monitors the impedance of an external current set resistor connected to a current set terminal. Various embodiments of the current supply with the monitor circuit are disclosed herein as applied in a battery charger, however, the monitor circuit disclosed herein may be applied to any current supply for any application and is not limited to the examples set forth herein. The monitor circuit can detect a short circuit at the current set terminal at any load current, even if the current supply is not in current regulation when the short occurs, using an internal impedance check to determine whether the external current set resistor falls below a predetermined "short" threshold.

Figure 1:
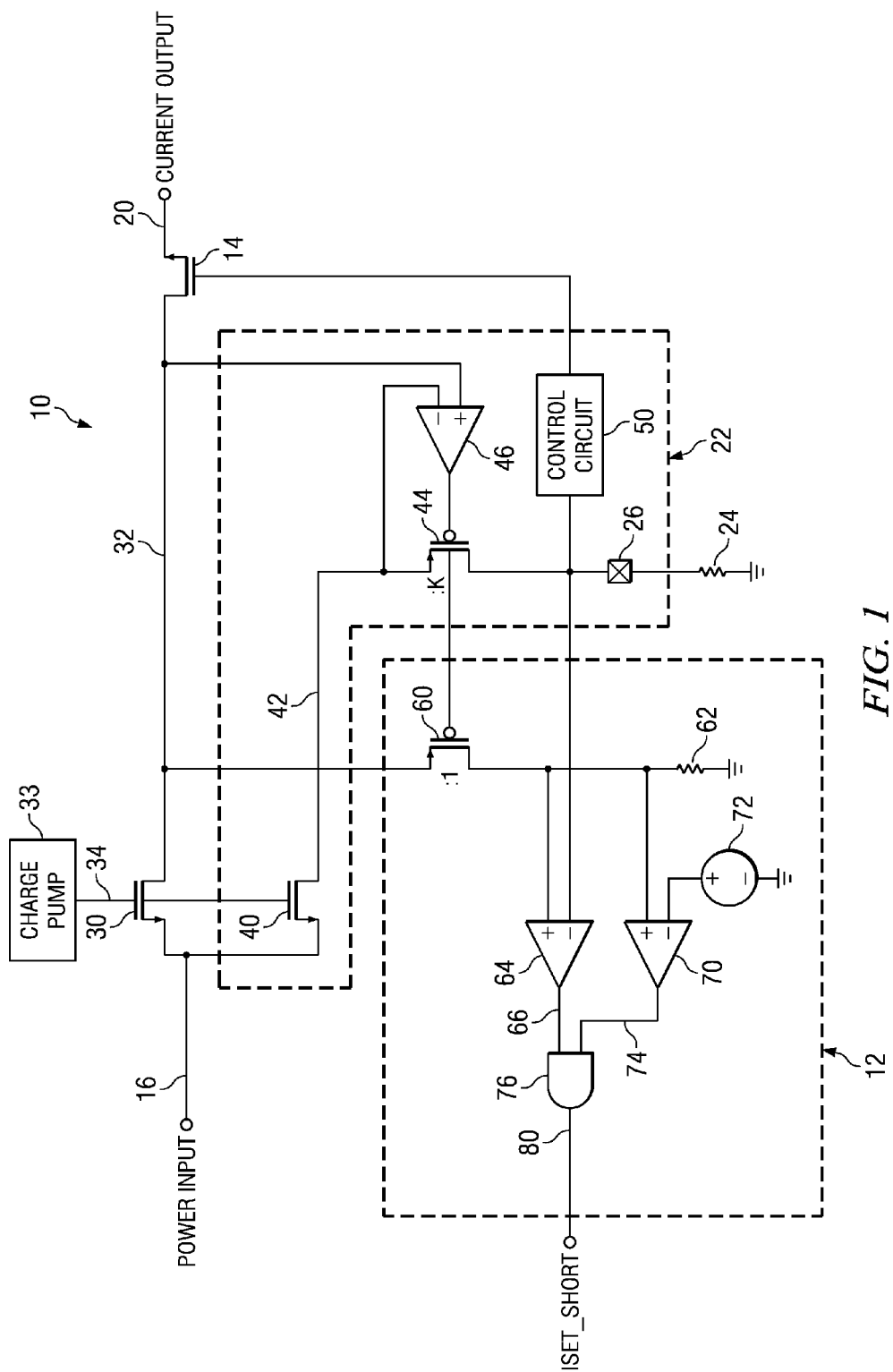
FIG. 1 depicts an apparatus for supplying an electrical current in accordance with some embodiments.

Turning now to FIG. 1, an example of a battery charger 10 having an impedance monitor 12 will be described. The battery charger 10 includes a current regulation switch 14 connected between a power input 16 and a current output 20. A current regulator 22 modulates the current regulation switch 14 so that the output current through the current output 20 is proportional to a current through a user connected current set resistor 24 connected to a current set terminal 26. A blocking transistor 30 is connected between the power input 16 and the current regulation switch 14 to block current from the current output 20 to the power input 16. The blocking transistor 30 also has a small resistance that establishes a voltage at an internal node 32 used in the current control process. In one embodiment, the blocking transistor 30 is an N-channel metal oxide semiconductor (NMOS) field effect transistor (FET) that is driven into the triode region by a charge pump (not shown) or other voltage source connected to the gate 34 of the blocking transistor 30. For example, the gate 34 may be driven to about 7 volts above the source which is connected to the power input 16, although this is not a limiting example. The blocking transistor 30 therefore acts as a resistor during operation with a low resistance on the order of an ohm or less. When the current supply is acting as a battery charger 10, the blocking transistor 30 may be turned off when the power input 16 is turned off to prevent current from a battery at the current output 20 from flowing back through the battery charger 10 to the power input 16.

The current regulator 22 includes a sense transistor 40 connected to the power input 16 in parallel with the blocking transistor 30. The sense transistor 40 is an NMOS transistor having a source connected to the power input 16 and a gate connected to the gate 34 of the blocking transistor 30. In one embodiment, the blocking transistor 30 and sense transistor 40 are matched FETS with the same gate and source voltages, with the sense transistor 40 being scaled down to lower the current. The ratio of the current through the sense transistor 40 and the current through the blocking transistor 30 is therefore substantially equal to the ratio of the aspect ratio of the sense transistor 40 and the aspect ratio of the blocking transistor 30. For example, if the blocking transistor 30 is 360 times larger than the sense transistor 40, and if the output current through the blocking transistor 30 is 1 A, the current through the sense transistor 40 would be about $\frac{1}{360}^{th}$ A or about 2.8 mA.

Figure 2:
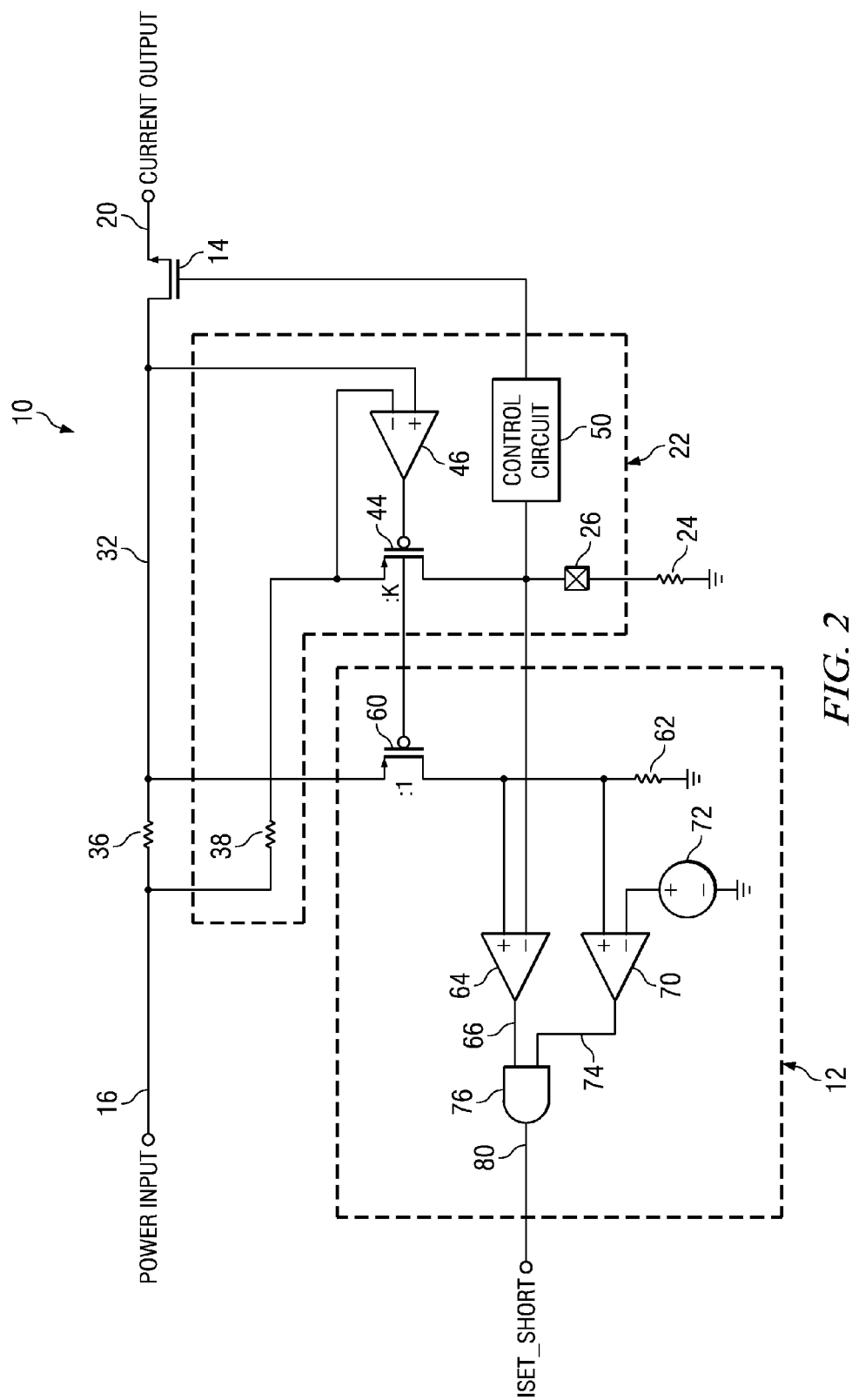
FIG. 2 depicts an apparatus for supplying an electrical current with resistors in place of blocking and sense transistors in accordance with some embodiments.

Referring for a moment to FIG. 2, the blocking transistor 30 may be considered to be a low impedance resistor 36, and the sense transistor 40 may be considered to be a resistor 38 with an impedance having a particular ratio to that of the resistor 36. For example, if the sense transistor 40 is 360 times smaller than the blocking transistor 30, the resistor 38 would have an impedance about 360 times that of the resistor 36. In other embodiments not needing a blocking transistor, an actual resistor 36 may be used in place of the resistor 36 and a resistor 38 in place of the sense transistor 40. Other than the control provided by the blocking transistor 30, the battery charger 10 of FIG. 2 operates substantially the same as the battery charger 10 of FIG. 1.

The drain voltage 42 of the sense transistor 40 is set at the same voltage level as the drain voltage of the blocking transistor 30 by a transistor 44 and amplifier 46. The transistor 44 is a P-channel metal oxide semiconductor (PMOS) FET with a source connected to the drain of the sense transistor 40 and a drain connected to the current set terminal 26. The amplifier 46 has a non-inverting input connected to the node 32 at the drain of the blocking transistor 30, an inverting input connected to the source of the transistor 44 and an output connected to the gate of the transistor 44. The sense transistor 40 thus operates as a scaled current mirror of the blocking transistor 30.

A control circuit 50 has an input connected to the current set terminal 26 and an output connected to the gate of the current regulation switch 14. The control circuit 50 controls the current regulation switch 14 to adjust the output current through the current regulation switch 14. The control circuit 50 is adapted to maintain a constant predetermined voltage level at the current set terminal 26 by modulating the current regulation switch 14. In one embodiment, the control circuit 50 is configured to maintain 1.5 V at the current set terminal 26. The resistance of the current set resistor 24 supplied by a user establishes the current that must flow through the sense transistor 40, transistor 44 and current set resistor 24 to maintain 1.5 V at the current set terminal 26. Because the output current through the blocking transistor 30 and current regulation switch 14 is proportional to the sense current through the sense transistor 40, decreasing the resistance through the current regulation switch 14 will raise the voltage at the current set terminal 26.

However, in the absence of the impedance monitor 12, if the current set terminal 26 is shorted and the effective impedance at the current set terminal 26 is reduced, the voltage at the current set terminal 26 will drop and the control circuit 50 will increase the output current, leading to a runaway current condition. The impedance monitor 12 monitors the impedance of the current set terminal 26 during operation and compares it with an internal reference impedance, without having to apply a test current to the current set terminal 26 other than the normal control current from the current regulator 22.

The impedance monitor 12 includes a transistor 60 used to mirror the current through the transistor 44. The transistor 60 may be a PMOS FET with a source connected to the node 32 at the drain of the blocking transistor 30 and a gate connected to the output of the amplifier 46. The transistor 60 is matched with transistor 44, although it may be scaled down to minimize the current drawn from the output current through the source of the transistor 60. Because the voltage at the drains of the blocking transistor 30 and sense transistor 40 is set to the same level by the transistor 44 and amplifier 46, the voltage at the sources of the transistors 60 and 44 are the same. The gate voltages of the transistors 60 and 44 are also the same. The transistor 60 thus acts as a current mirror of the transistor 44. If the transistor 44 is K times larger than the transistor 60, the current through the transistor 60 will be K times smaller than that through the transistor 44.

The impedance monitor 12 also includes a reference impedance 62 connected to the transistor 60 so that the impedance monitor 12 monitors the impedance of the current set terminal 26 rather than merely measuring the current through the current set terminal 26. The reference impedance 62 may be an internal fixed resistor. For example, if the battery charger 10 is implemented in an integrated circuit, the impedance monitor 12 including the reference impedance 62 may be part of the integrated circuit along with the blocking transistor 30, current regulation switch 14 and current regulator 22, with only the current set resistor 24 being an external user supplied component.

The resistance of the reference impedance 62 is selected to establish the desired short resistance threshold. The impedance monitor 12 determines that the current set terminal 26 is shorted when the impedance at the current set terminal 26 falls below the short resistance threshold. If the aspect ratio of transistor 60 is smaller than that of transistor 44 by a factor of K, the current through the reference impedance 62 will be K times smaller than that through the current set terminal 26 and current set resistor 24. The resistance of the reference impedance 62 is therefore set at K times the short resistance threshold. For example, if the current set resistor 24 should always be greater than 400Ω, the short resistance threshold may be set at 400Ω by setting the reference impedance 62 at K times 400 Ω.

A comparator 64 is used to compare the voltage at the current set terminal 26 with the voltage at the reference impedance 62. The comparator 64 has an inverting input connected to the current set terminal 26 and a non-inverting input connected to the reference impedance 62. If the voltage VSET at the current set terminal 26 falls below the voltage VSHORT at the reference impedance 62, the output 66 of the comparator 64 is asserted. The comparator 64 tests for the condition $V_{SET} < V_{SHORT}$ and asserts the output 66 when true. This condition is equivalent to $I_{SET} \times R_{SET} < (I_{SET}/K) \times (R_{SHORT} \times K)$, where $I_{SET}$ is the current through the current set terminal 26 and current set resistor 24, $R_{SET}$ is the impedance of the current set resistor 24, and $R_{SHORT}$ is the short resistance threshold. It can be seen that the scaling factor K and the current through the current set terminal 26 cancel, so the comparator 64 is testing for the condition $R_{SET} < R_{SHORT}$.

Because voltage comparators are not ideal, they may have an input offset voltage that causes errors when the two inputs are within a few millivolts or so of each other. This condition is most likely to occur if the current through the reference impedance 62 is very low, which may occur at the end of a charge cycle in a battery charger 10 when the charge current tapers off and may get down on the order of 10 mA. At this point, the voltage at the reference impedance 62 is in the range of typical comparator input offset voltages. The battery charger 10 is generally adapted to turn off if a short is detected at the current set terminal 26 by the impedance monitor 12 and to remain off until the battery charger 10 is reset or power is cycled. Because this is a catastrophic failure, false positives by the impedance monitor 12 should be avoided. A low current detector may be included in the impedance monitor 12 to prevent false positives by determining when the current through the reference impedance 62 is very low, and disabling the output of the impedance monitor 12. A comparator 70 has a non-inverting input connected to the reference impedance 62 and an inverting input connected to a reference voltage 72 set at a low voltage level. The output 74 of the comparator 70 is combined with the output 66 of the comparator 64 in an AND gate 76, disabling the output 80 of the impedance monitor 12 when the current through the reference impedance 62 is below a threshold value. The threshold below which the impedance monitor 12 is disabled may be selected as desired to so that the impedance monitor 12 is effective at detecting shorts on the current set terminal 26 while avoiding false positives.

The battery charger 10 may react to the detection of a shorted current set terminal 26 by the impedance monitor 12 in any desired manner, such as blocking the output current to the current output 20 until the battery charger 10 is reset or for a particular amount of time. This may be accomplished in any suitable manner, including turning off the current regulation switch 14.

By monitoring the impedance of the current set terminal 26, the impedance monitor 12 is not dependent on the output current level through the current output 20 or on the set current through the current set terminal 26. The impedance monitor 12 is also not dependent on the load connected to the current output 20, and monitors the current set terminal 26 for shorts in real time during normal operation, including when the output current is not in regulation.

Figure 3:
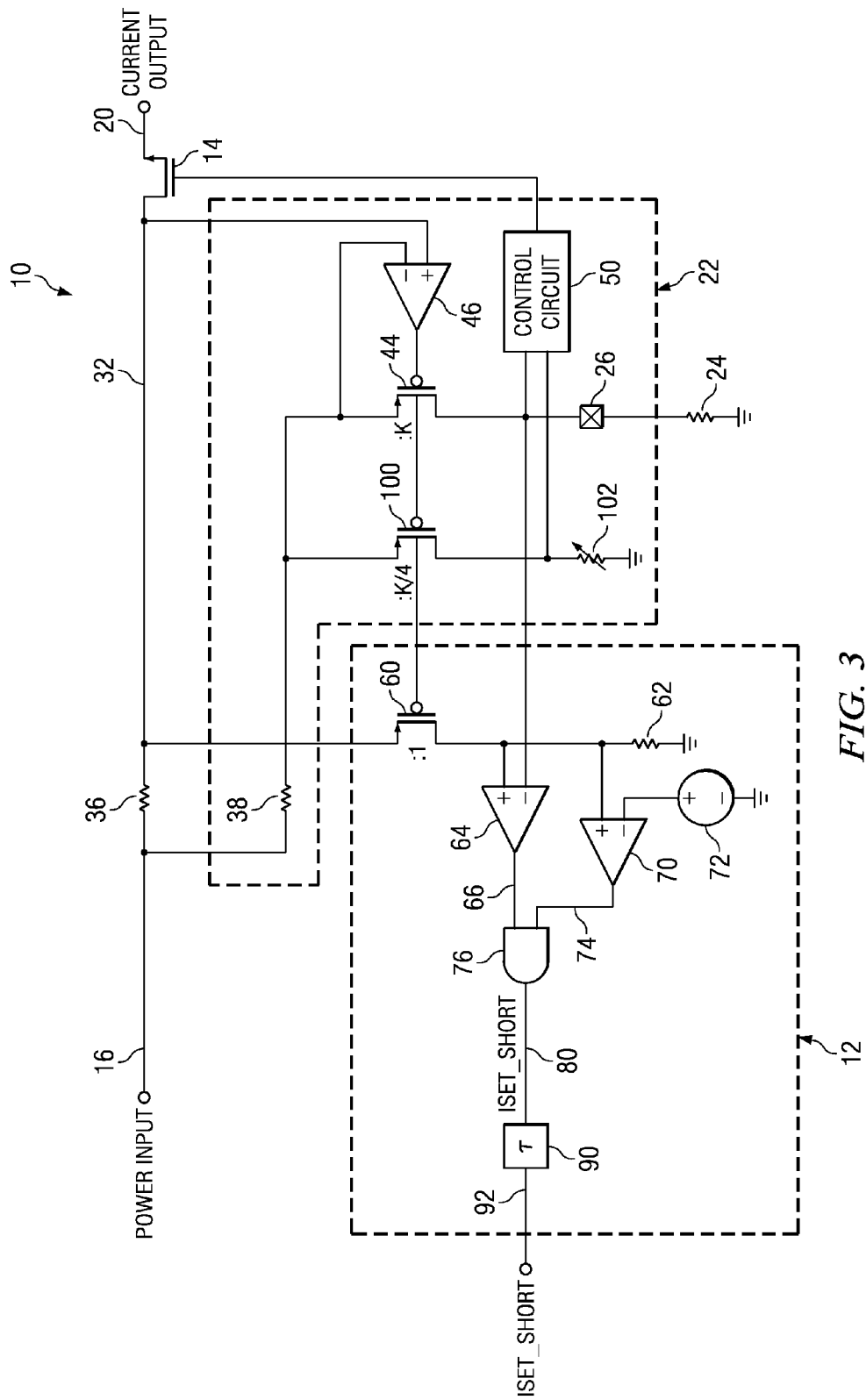
FIG. 3 depicts an apparatus for supplying an electrical current with a current limiter in accordance with some embodiments.

Turning now to FIG. 3, the battery charger 10 may include a deglitcher 90 connected to the output 80 of the impedance monitor 12 to further prevent false positives. The deglitcher 90 requires that the comparator 64 detect a short at the current set terminal 26 for a certain period of time before asserting the output 92 of the deglitcher 90 so that the impedance monitor 12 does not disable the battery charger 10 due to noise. The deglitcher 90 may be implemented in any desired manner, using digital and/or analog circuits. Any desired delay may be implemented in the deglitcher 90, for example several hundred microseconds.

A current limiter may also be included in the battery charger 10 to prevent runaway currents, particularly during the deglitching period. The current limiter includes a transistor 100 connected in parallel with the transistor 44 to create another current mirror. The transistor 100 has a source connected to the drain of the sense transistor 40 (or to the resistor 38 if used in place of the sense transistor 40) and a gate connected to the output of the amplifier 46. An internal resistor 102 established the upper current limit for the current output 20. The control circuit 50 monitors the voltage across the resistor 102, and if the voltage increases above a threshold level, indicating that the current output 20 has reached the current limit, the control circuit 50 modulates the current regulation switch 14 to reduce the current through the current regulation switch 14. The transistor 100 may be scaled as desired to reduce the current through the transistor 100, with the impedance of the resistor 102 adjusted accordingly.

In various embodiments, the transistor 100 and resistor 102 may be part of a selectable USB current limiting circuit to comply with universal serial bus (USB) requirements. In these embodiments, the control circuit 50 may be configured to either disable USB current limiting or to select one or more current limiting levels, such as 100 mA for USB 100 or 500 mA for USB 500. To select the various current limits, the resistance of the resistor 102 may be varied, for example by switching in different resistors of a resistor bank. The control circuit 50 attempts to maintain a voltage of 1.5 V at the drain of the transistor 100. The multiple control loops monitored by the control circuit 50 (e.g., from transistor 44 and from transistor 100) operate in parallel, with whichever loop that rises above the setpoint voltage taking precedence.

To prevent runaway currents during the deglitching period due to a short at the current set terminal 26, the current limit of the transistor 100 and resistor 102 is set to limit the current even if the USB current limiting is not selected in the control circuit 50. If the USB current limiting is not selected, the control circuit 50 would be configured to turn on USB current limiting and resistor 102 would be adjusted to set a current above the normal operating current of the battery charger 10 but below a level that would cause instantaneous damage to the battery charger 10. For example, the resistor 102 may be adjusted to establish a current limit of 1.2 A in a battery charger 10 designed for a upper current limit of 1.1 A during normal continuous operation. Even if the current set terminal 26 were shorted, the current regulation switch 14 would be modulated based on the transistor 100 and resistor 102 by the control circuit 50 to regulate the current at the current output 20 at 1.2 A until the deglitcher 90 asserts the output 92 of the impedance monitor 12 and disables the battery charger 10. Thus, existing circuitry such as USB current limits may be used to prevent the battery charger 10 from being damaged by a short circuited current set terminal 26 during delays caused by the deglitcher 90, and the deglitcher 90 avoids erroneously disabling the battery charger 10 due to noise when the current set terminal 26 is not shorted.

Figure 4:
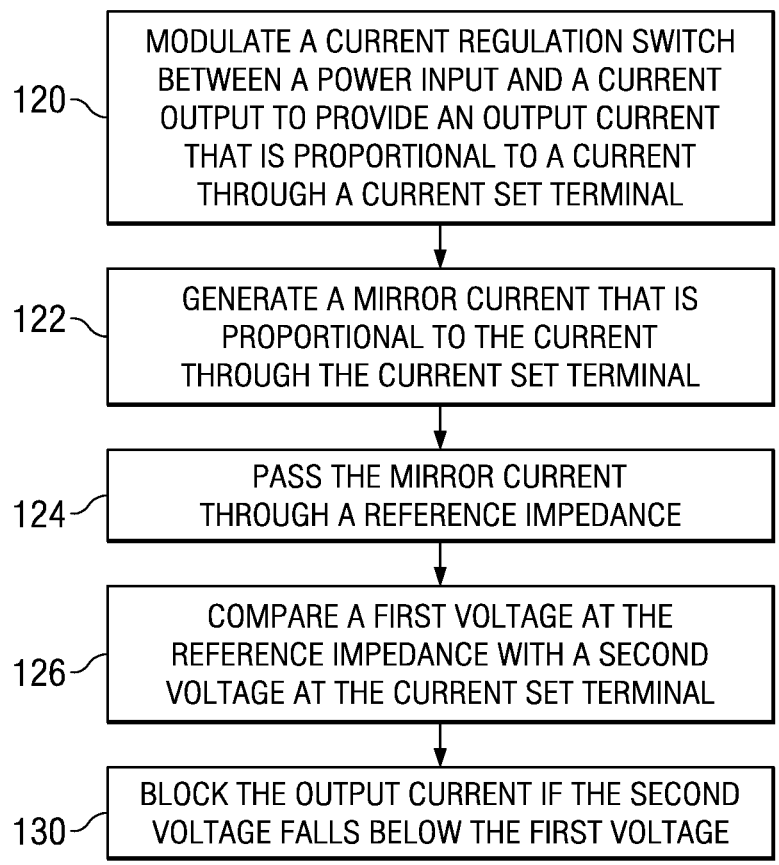
FIG. 4 depicts a flow chart of method of supplying an electrical current in accordance with some embodiments.

Turning now to FIG. 4, a method of supplying an electrical current will be summarized. A current regulation switch 14 between a power input 16 and a current output 20 is modulated to provide an output current that is proportional to a current through a current set terminal 26. (Block 120) A mirror current (e.g., through the transistor 60) is generated that is proportional to the current through the current set terminal 26. (Block 122) The mirror current is passed through a reference impedance 62. (Block 124) The voltage at the reference impedance 62 is compared with the voltage at the current set terminal 26. (Block 126) If the voltage at the current set terminal 26 falls below the voltage at the reference impedance 62, the output current is blocked. (Block 130)

While illustrative embodiments have been described in detail herein, it is to be understood that the concepts disclosed herein may be otherwise variously embodied and employed.

What is claimed is:

1. An apparatus for supplying an electrical current, the apparatus comprising:
   a power input;
   a current output;
   a current regulation switch connected in a current path between the power input and the current output;
   a current regulator connected to the current regulation switch, the current regulator comprising a current set terminal, wherein a current through the current regulation switch is proportional to a current through the current set terminal; and
   an impedance monitor connected to the current set terminal comprising:
   one transistor of a current mirror being connected to the current regulator, wherein the current mirror is adapted to produce a current that is proportional to the current through the current set terminal;
   a reference impedance connected to the current mirror, the impedance monitor further comprising a first comparator having a first input connected to the reference impedance and having a second input connected to the current set terminal, wherein an output of the comparator is asserted when an impedance of the current set terminal falls below the reference impedance; and a low current detector including a second comparator connected to the current mirror, wherein the output of the first comparator is gated off by a logic gate when the low current detector detects that the current through the current mirror is lower than a threshold current level.

2. The apparatus of claim 1, wherein the apparatus is adapted to block the current path when the output of the comparator in the impedance monitor is asserted.

3. The apparatus of claim 1, wherein the second comparator has a first input connected to the reference impedance and a second input connected to a reference voltage.

4. The apparatus of claim 1, the logic gate of the impedance monitor comprises an AND gate with a first input connected to the output of the first comparator, a second input connected to an output of the comparator comprising the low current detector, and an output connected to an output of the impedance monitor.

5. The apparatus of claim 1, the impedance monitor further comprising a deglitcher.

6. The apparatus of claim 5, wherein the current regulator comprises a current limiter adapted to limit the current through the current regulation switch.

7. An apparatus for supplying an electrical current, the apparatus comprising:
a power input;
a current output;
a current regulation switch connected in a current path between the power input and the current output;
a current regulator connected to the current regulation switch, the current regulator comprising a current set terminal, wherein a current through the current regulation switch is proportional to a current through the current set terminal;
an impedance monitor connected to the current set terminal, the impedance monitor comparing an impedance at the current set terminal to an internal reference impedance to determine if the impedance at the current set terminal is below a predetermined value;
a blocking transistor having a source connected to the power input and a drain connected to the current regulation switch,
wherein the current regulator comprises:
a sense transistor having a source connected to the power input and a gate connected to a gate of the blocking transistor;
a second transistor having a source connected to a drain of the sense transistor and a drain connected to the current set terminal; and
an amplifier having a first input connected to the drain of the blocking transistor, a second input connected to the source of the second transistor, and an output connected to a gate of the second transistor, and
wherein the impedance monitor comprises:
one transistor of a current mirror being connected to the current regulator, wherein the current mirror is adapted to produce a current that is proportional to the current through the current set terminal; and
the reference impedance being connected to the current mirror.

8. The apparatus of claim 7, wherein the current mirror comprises a third transistor having a source connected to the drain of the blocking transistor, a gate connected to the output of the amplifier, and a drain connected to the reference impedance.

9. The apparatus of claim 8, wherein the reference impedance has a value equal to a short resistance threshold multiplied by a ratio between an aspect ratio of the second transistor and an aspect ratio of the third transistor, wherein an impedance at the current set terminal is identified as short circuited when the impedance at the current set terminal is less than the short resistance threshold.

10. The apparatus of claim 7, wherein the current regulator further comprises a control circuit having an input connected to the current set terminal and an output connected to the current regulation switch, wherein the control circuit is adapted to modulate the current regulation switch to maintain a predetermined voltage level at the current set terminal.

11. The apparatus of claim 7, wherein the amplifier is adapted to maintain a same voltage level at the drain of the sense transistor as at the drain of the blocking transistor.

12. A method of supplying an electrical current, the method comprising:
modulating a current regulation switch between a power input and a current output to provide an output current that is proportional to a current through a current set terminal;
generating a mirror current that is proportional to the current through the current set terminal;
passing the mirror current through a reference impedance;
comparing a first voltage at the reference impedance with a second voltage at the current set terminal; and
blocking the output current if the second voltage falls below the first voltage.

13. The method of claim 12, wherein the comparing is performed continuously during normal operation of the supplying of the electrical current.

14. The method of claim 12, further comprising deglitching a result of the comparing before said blocking.

15. The method of claim 14, further comprising disabling the blocking if the mirror current is lower than a threshold current.

16. The method of claim 14, further comprising limiting the output current to an upper current limit at least during the deglitching.

17. An apparatus for supplying an electrical current, the apparatus comprising:
a power input;
a current output;
a blocking transistor having a source connected to the power input;
a regulation transistor having a drain connected to a drain of the blocking transistor and a source connected to the current output;
a sense transistor having a source connected to the power input and a gate connected to a gate of the blocking transistor;
a fourth transistor having a source connected to a drain of the sense transistor and a drain connected to a current set terminal;
an amplifier having a first input connected to the drain of the blocking transistor, a second input connected to the source of the fourth transistor, and an output connected to a gate of the fourth transistor;
a control circuit connected between the current set terminal and a gate of the regulation transistor, wherein the control circuit is adapted to modulate the regulation transistor to maintain a predetermined voltage level at the current set terminal;
a fifth transistor having a source connected to the drain of the blocking transistor and a gate connected to the output of the amplifier;
a reference impedance connected between a drain of the fifth transistor and a ground;

a first comparator having a first input connected to the drain of the fifth transistor and a second input connected to the current set terminal;

a second comparator having a first input connected to the drain of the fifth transistor and a second input connected to a voltage reference;

an AND gate having a first input connected to an output of the comparator and a second input connected to an output of the second comparator; and a deglitcher connected to an output of the AND gate, wherein the apparatus is adapted to block a current through the current output when an output of the deglitcher is asserted.

* * * * *